Figure 1:
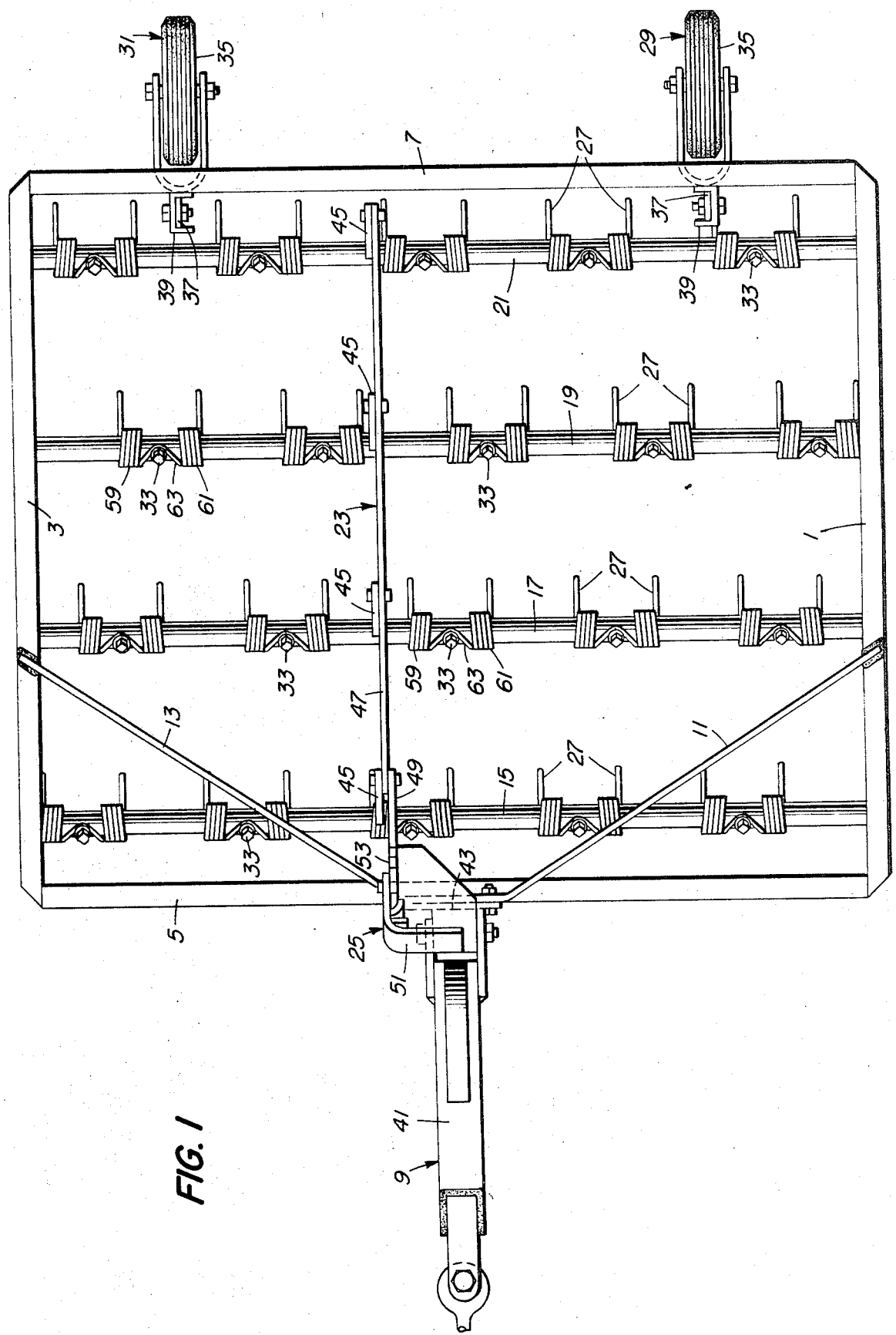

United States Patent [19]
Neff

[11] 3,765,159
[45] Oct. 16, 1973

[54] THATCH REMOVAL DEVICE
[76] Inventor: Dean O. Neff, 1318 Washington Street, Rochester, Ind.
[22] Filed: Oct. 16, 1972
[21] Appl. No.: 297,672

[52] U.S. Cl.............. 56/396, 56/400, 172/622
[51] Int. Cl............................................ A01d 77/00
[58] Field of Search................... 56/375, 396–398, 56/400; 172/620–622

[56] References Cited
UNITED STATES PATENTS

| | | | |
|---|---|---|---|
| 1,176,334 | 3/1916 | Bergman | 172/622 X |
| 2,704,920 | 3/1955 | Fulper | 172/622 |
| 693,882 | 2/1902 | Morrison | 172/621 X |
| 3,099,347 | 7/1963 | Dahlquist | 56/400 X |
| 3,362,480 | 1/1968 | Barber | 56/400 X |
| 3,066,470 | 12/1962 | Johnston | 56/400 |
| 2,502,769 | 4/1950 | Warnke | 56/400 |
| 2,521,492 | 9/1950 | Synck et al. | 56/400 X |
| 432,168 | 7/1890 | O'Neill et al. | 56/329 X |

Primary Examiner—Louis G. Mancene
Assistant Examiner—J. A. Oliff
Attorney—Don O. Winslow

[57] ABSTRACT

A device for removing thatch from lawns comprising (1) a rigid frame, (2) hitching means to attach the frame to a prime mover, (3) a plurality of parallel cross members extending between side members of the frame and (4), affixed to each cross member, a series of downwardly extending tines, which series is staggered with respect to the series on the preceding and following cross members, the ends of the tines being bent forwardly by an angle of from about 20° to about 40° from the perpendicular.

8 Claims, 4 Drawing Figures

THATCH REMOVAL DEVICE

This invention relates to a device for the removal of thatch from grass lawns and to the method of removing thatch from grass lawns therewith.

In the cultivation and maintenance of conventional grass lawns, a serious problem exists in the gradual accumulation of thatch in the upper part of the root system. By the term "thatch" is meant the mass of dead roots and cuttings of grass and weeds which normally accumulates in the upper root system of a lawn and which if left in place seriously impedes the permeability of the soil and the further growth of healthy roots. Because it is not possible to prevent the accumulation of thatch, various means to remove it at least partially have been proposed by the prior art, including manual raking and devices which utilize rapidly oscillating wires, rapidly rotating wires and rotating knives. All of these but the handrake are especially engineered engine-driven devices which are both complicated and expensive. Furthermore, such engine-powered devices, through at least moderately effective, are also excessively damaging to the lawns because they literally rip through the entire root system, rather than selectively remove the dead growth. Moreover, certain of the devices, especially those using wires, are not self-cleaning and therefore have to be shut down frequently during the thatch removal process to clean the wires manually.

In view of the shortcomings of the prior art devices, applicant has invented a remarkably simple device for the removal of thatch from lawns which has no powered movable parts, which removes thatch with minimal lawn damage and which is self-cleaning in normal operation.

Applicant's invention is therefore a device for removing thatch from lawns when it is dragged thereover comprising:

1. a rigid frame having front and rear end members and side members;
2. hitching means by which the frame can be flexibly attached to a prime mover in substantially parallel relationship to the ground over which the device is passed;
3. a plurality of cross members extending in parallel relationship between said frame side members; each such cross member having affixed thereto
4. a series of evenly spaced downwardly extending tines comprising a tine shaft and a tine end, each series being in staggered relationship with respect to the series on the preceding cross member, if any, and the following cross member, if any, the tine shafts being essentially perpendicular to the ground and the tine ends being bent forwardly parallel to the direction of travel by an angle of from about 20° to about 40° from the perpendicular, and
5. means by which the tines in each series can be raised and lowered thereby regulating the extent of penetration of the tine ends into the lawn surface.

When the above-described device is dragged over a grassy surface, the tines act to remove the thatch by the following sequence of steps which is repeated by each tine throughout the thatch removing operation;

1. the weight-bearing tines penetrate to the thatch layer;
2. the tine ends engage thatch particles which are loosened from the surrounding mass, by which the tines are deflected rearwardly and upwardly toward the grass surface;
3. The upwardly deflected tines with thatch engaged on the leading edges of the tines are dragged briefly on the grass surface by which a portion of the engaged thatch is removed by the scraping of the tine along the surface;
4. when the tine reaches maximum deflection, the normal incongruities of the ground and/or voids in the thatch layer allow the rearwardly extended tine to recoil rapidly forward in a flicking action which propels the remaining thatch from the tine; and
5. the tine resumes its normal position penetrating the thatch layer and the above sequence is repeated as forward motion of the device is continued.

Though the device superficially resembles in appearance an ordinary hay rake or spring tooth harrow, there are two major differences which are responsible for the unique action of the device and which are not obtainable with ordinary tined raking devices. Firstly, to obtain proper penetration to the thatch layer, it is necessary that the weight of the device be such that the average downward force on each tine (tine pressure) be at least about 50 pounds per square inch of tine cross sectional area and preferably at least about 60 pounds. To avoid excessive penetration, it is preferred that the average tine pressure not exceed about 125 pounds, and preferably not over about 100 pounds. A tine pressure of 75–85 pounds is especially preferred. Depending upon the weight of the materials used, additional weight may be affixed to the device to obtain higher tine pressures. Secondly, to obtain adequate cleaning action of the tines, it has been found that the lower portion of the tines (the lower 1.5–2.0 inches) should be bent forwardly by an angle of between 20° and 40° (preferably between 24° and 34°). By this means the angle of rearward deflection is increased and the forward flicking action of the tine is increased markedly, thus augmenting the cleaning action of the thatch from the tines. It is interesting to note that when the angle of forward bend is greater than about 40°, the tine ends tend to penetrate excessively into the substrate soil. On the other hand, when the angle is less than about 20°, both the rearward deflection and the forwarding flicking action are reduced with concomitantly lower cleaning action on the tine ends. A tine end angle of about 30° has been found to be optimum.

In addition to the configuration of the tines, the spatial relationship of the tines to each other is quite important. In particular, it has been found that the lateral space between tines should be at least about 3 inches and preferably about 4 inches to avoid clogging of the tines. Likewise, the space between the cross members on which the tines are mounted should be at least about 0.75 tine length in order that the thatch on any one tine not interfere with the freedom of action of any adjacent tine.

Reduction of interference to the independent action of each tine by the movement of order loaded tines, as well as more effective and complete distribution of the dethatching process, is still further assured by staggering each series of tines such that no single tine is placed directly behind or directly in front of any tine on the preceding or following cross members. Preferably, each series of tines should be in staggered relationship with each of the other series of tines on the device.

In theory, of course, the unique action of the above-described tines could be achieved with a single tine, a single row of tines or a single column of tines. However, in order to provide an operable device for most practical, economical and effective utilization it is preferred to employ at least three cross members having at least six evenly spaced tines on each cross member. To avoid excessive weight and to obtain optimum tine action, it is preferred to use no more than about five cross members each containing no more than 14 tines.

The preferred size of the device for use with small garden tractors and ride-on mowers of six or more horsepower is one having four cross members each having 10 tines mounted thereon spaced about 4 inches apart and weighing approximately 85 lbs. Unitary sets of two tines made from a single length of 3/16 inch diameter spring steel wire have been found to be preferred since they are readily mounted, of proper strength and flexibility and need only to have the ends of the tines bent in accordance with the discussion hereinabove to be used in the device of the invention.

The tines to be used in the invention are, of course, made from spring steel of sufficient rigidity to give firm engaging action on the thatch, yet with sufficient flexibility to undergo substantial flexing action both forwardly and rearwardly. Though simple wire tines may be used, fixed coil-type tines such as those used as rake teeth for conventional hay rakes are preferred.

The tines which have been found to be quite effective require a force of about 10 pounds, applied rearwardly at the point of the forward bend, to obtain a deflection of two inches. If the force required to obtain such deflection (bending resistance) is too high, e.g. above about 20 pounds, the tine is stiff by which cleaning action of the tines is greatly reduced and lawn damage may result. On the other hand, if the force to obtain such deflection is less than about 3–4 pounds, the bending resistance of the tine is too small to yield sufficient thatch removal. A tine bending resistance of from about 6 to about 15 pounds is preferred.

Preferred types of tines are double tine units formed from a single length of spring steel wire in which a first tine is surmounted by a first coil connecting along the rotational axis of the coils to a second coil surmounting a second tine. With such tines the cross members can be inserted through the proper number of tine units and the units fixed in place by means of set screws into the cross members.

An important aspect of the invention is the hitching means, for it has been found that the most effective dethatching operation is carried out when the frame is essentially parallel to the ground surface over which it is passed or, preferably with the front of the device slightly higher than the rearward end. By this means more effective removal of thatch from the tines is obtained. Consequently, it is preferred that the hitching means be adjustable to accommodate a variety of prime movers.

In addition, the device may also contain a set of wheel supports. However, these are not essential to the operation of the device since it is imperative during its operation for thatch removal that the entire weight of the device be borne by the tines. Any wheel support means are therefore desirable mainly for storage and handling purposes, and, when used at all, should be retracted during thatch removal operations. However, such means may be used when the device is used for such other operations as raking and preparing seed beds in which case the wheel supports may be used in conjunction with the adjustable hitching means to regulate the degree of penetration of the tines into the soil or other surface in which they are being used. Such wheel supports will normally be mounted to the rear of the device, on or near the rear end member of the frame.

Figure 2:
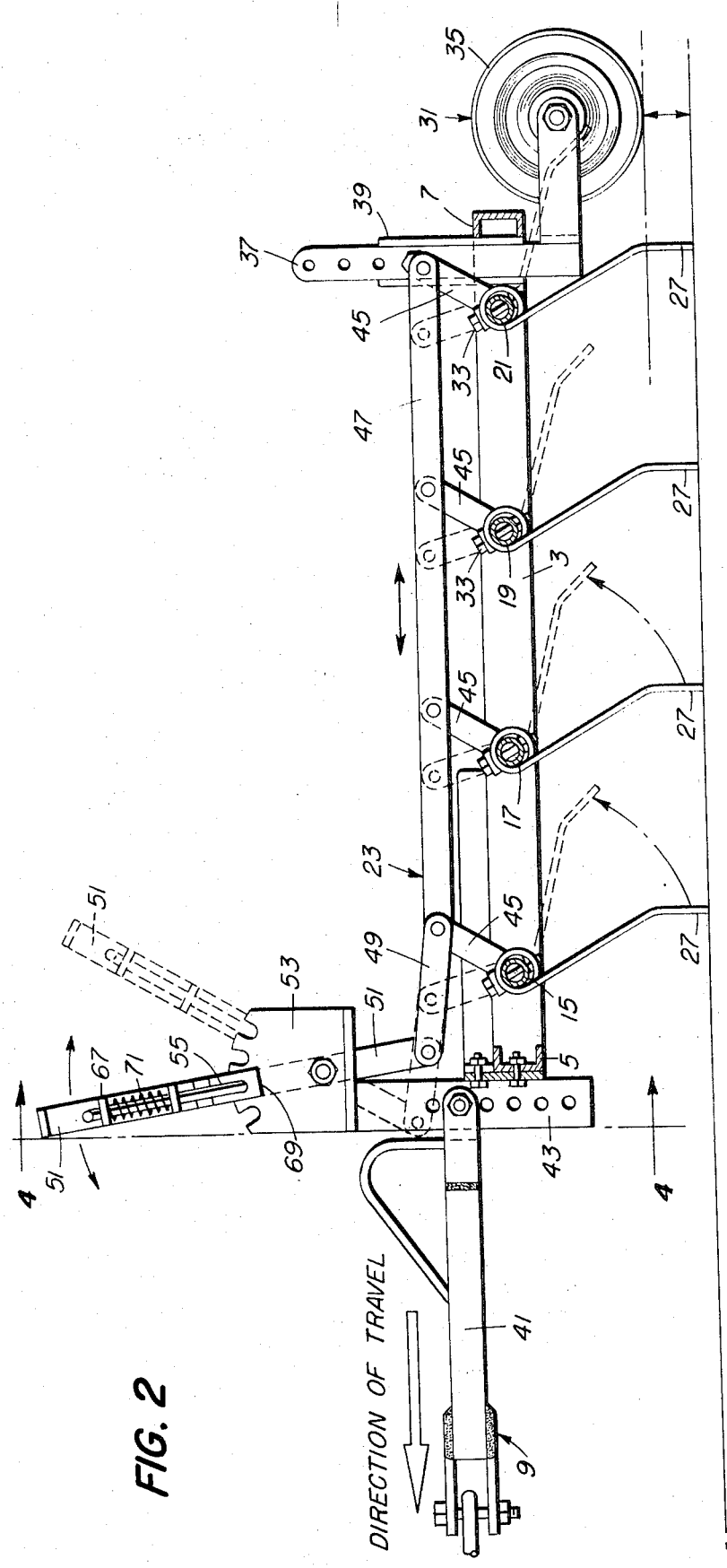
Figure 3:
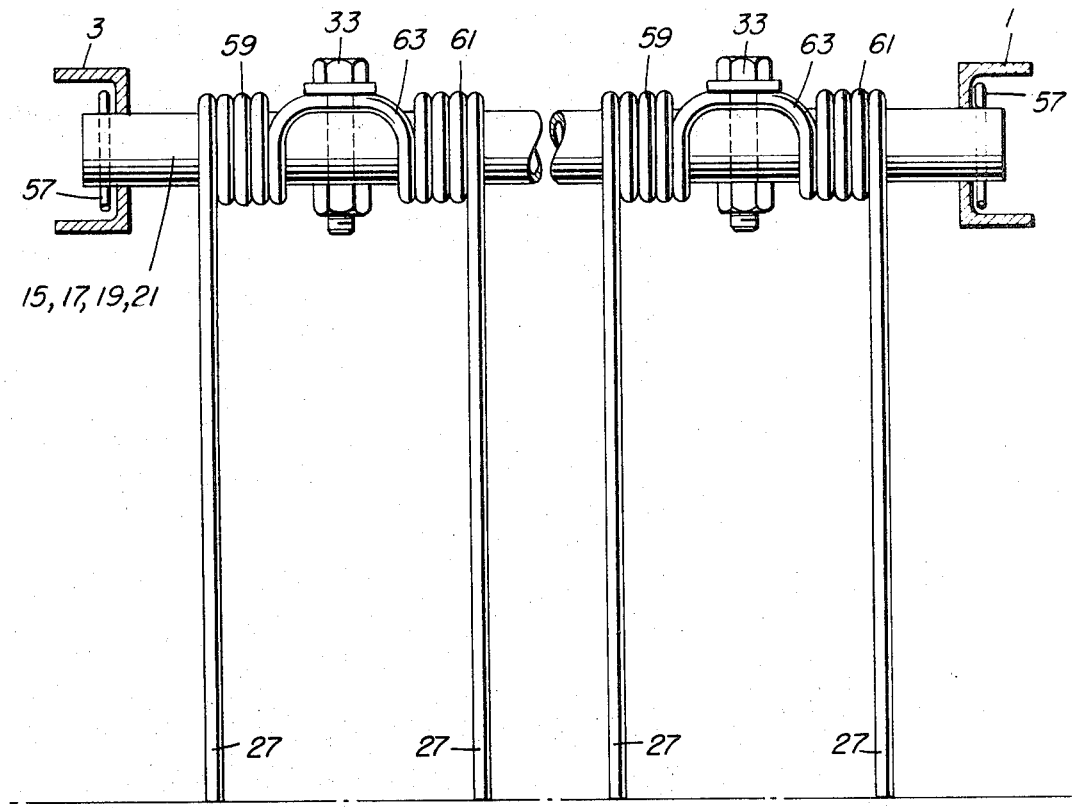

The invention can be better understood by reference to the drawings comprised of four figures, as follows:

FIG. 1 Overhead view of the invention;

FIG. 2 Side elevation of the invention with tines positioned for dethatching operation;

FIG. 3 Front elevation showing details of cross member and tine assembly; and

Figure 4:
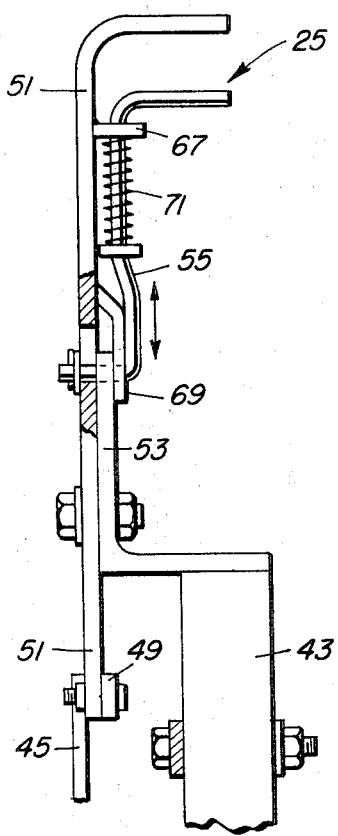

FIG. 4 Detail of locking mechanism for cross member rotation linkage.

Referring now to FIG. 1, the invention is shown as having a rigid frame comprising two side members 1,3, front end member 5 and rear end member 7. Mounted on the front end member 5 are hitching means 9, by which the frame can be flexibly attached to a prime mover, and reinforcing bars 11 and 13 extending between front end member 5 and side members 1 and 3 respectively. Extending between side members 1 and 3 in parallel relationship to each other and to the frame end members are cross members 15, 17, 19 and 21, which are rotatable by means of a rotational linkage 23. By means of locking mechanism 25, which is operably attached to rotational linkage 23, the cross members may be locked into various positions of rotation.

Each of the cross members 15, 17, 19 and 21 has affixed thereto a series of ten evenly spaced coil-loaded tines extending downwardly from the cross members. (In the drawing, FIG. 1, two tines only in each series are identified by the number 27.) Each series of tines is in staggered relationship to the preceding and following series by which the path of each tine during forward motion of the device is different from the path of every other tine. Affixed to the rear frame end member are a pair of wheel assemblies 29 and 31, which are vertically adjustable to various distances below the frame.

With reference to FIG. 2 of the drawings, the invention is seen in side elevation by which certain details can be seen more clearly. In particular, it will be noted that the ends of the tines 27 are bent forwardly in the direction of travel by 30° and that the tines are attached to the rotatable cross members, 15, 17, 19 and 21, by means of a series of bolts 33 fastened through the cross members.

The wheel assemblies each comprising a wheel 35 and wheel support 37 are adjustable in height, i.e. distance below the frame, by selection of any of a series of bolt openings thereon through which to bolt the support to wheel support receptacle 39. The hitching means here comprising hitching bar 41 and adjustable hitch support 43 is similarly adjusted in height by selection of any of a series of bolt openings placed along the hitch support 43 through which to bolt the hitching bar to the hitch support.

The rotational linkage comprises a series of primary links 45 affixed to the cross members connecting pivotably to a secondary link 47 in turn connecting pivotably with an angle compensation link 49 pivotably connecting to the end of pivot bar 51. Pivot bar 51 is pivotably affixed to a notched plate 53. Locking of the cross members at a selected rotational angle is done by lifting the spring-loaded crank-shaped positioning lug 55, turning pivot bar 51 to a position covering the desired notch on plate 53 and then releasing the positioning lug so that it drops into the desired notch.

FIG. 3 of the drawings shows details of the attachment of the tines 27 to the cross members 15, 17, 19 and 21 and of the attachment of the cross members to the frame side members 1 and 3. In particular, it will be noted that cross member 15 passes through the side members 1 and 3 and is restrained from lateral movement by cotter pins 57 near the end of the cross member. The tines 27 illustrated here are of a conventional type used as rake teeth for agricultural equipment comprising two units of two tines each formed from a single length of spring steel wire in which the left tine is surmounted by a first coil 59 connecting to a second coil 61 surmounting the right tine. The connecting portion of the tine unit 63 is of a U-shaped configuration to facilitate clamping of the tine unit to the cross member by means of tine unit bolts 65.

FIG. 4 of the drawings is a detail of the locking mechanism by which the cross members may be locked into a preselected rotational position for operation of the device. Notched plate 53 is here mounted on hitch support 43. Crank-shaped positioning lug 55, comprising a handle end, upper shaft, spring flange, lower shaft and lug end is passed through a spring support 67, mounted on the upper part of the pivot bar 51, then through lug support 69 which is likewise mounted on the same side of pivot bar 51. By raising the positioning lub clear of a notch, spring 71 is compressed. When pivot bar 51 is repositioned over another notch and the positioning lug released, the force of the spring serves to drop the positioning lug into such notch thereby locking the pivot bar firmly in place.

The locking mechanism for the cross members and the means for adjustment of the height of the hitching bar and the wheel assemblies as described hereinabove are preferred because of their simplicity and comparative ease of manufacture. However, it will be recognized that other suitable mechanisms may be used as well. Therefore, it is not intended that these descriptions constitute a limitation as to use of other means, but merely an illustration of suitable means.

Consequently, though only a limited number of embodiments of the present invention have been specifically disclosed, it will be apparent that many variations may be made therein, all within the spirit of the invention as defined herein.

What is claimed is:

1. A device for removing thatch from lawns when it is passed thereover comprising:
   1. a rigid frame having front and rear end members and side members;
   2. hitching means by which the frame can be flexibly attached to a prime mover in substantially parallel relationship to the ground over which the device is passed;
   3. a plurality of cross members extending in parallel relationship between said frame side members; each such cross member having affixed thereto
   4. a series of evenly spaced downwardly extending flexible tines comprising a tine shaft and a tine end, each series being in staggered relationship with respect to the series on the preceding cross member, if any, and the following cross member, if any, the tine shafts being essentially perpendicular to the ground, the tine ends being bent forwardly parallel to the direction of travel by an angle of from about 20° to about 40° from the perpendicular and the tines having a bending resistance of from about 3 to about 20 pounds; and
   5. means by which the tines in each series can be raised and lowered thereby regulating the extent of penetration of the tine ends into the lawn surface, the weight of the device being such that the tine pressure is from about 50 to about 125 pounds per square inch of tine cross-sectional area.

2. The device of claim 1 in which the cross members are rotatably adjustable by means for rotation thereof in such manner that the tines in each series can be raised and lowered by rotation of said cross members thereby regulating the angle and extent of penetration of the tines into a substrate.

3. The device of claim 2 in which the means for rotation of the cross members is a linkage operably connected to all cross members by which simultaneous rotation of all cross members is obtained.

4. The device of claim 1 in which the device is comprised of at least three rotatably adjustable cross members.

5. The device of claim 1 in which each series of tines contains at least six tines.

6. The device of claim 1 in which the spacing along the frame side members between parallel cross members is about 0.75 times the length of the tines.

7. The device of claim 1 in which the bending resistance of the tines is from about 6 to about 15 pounds and the tine pressure is from about 60 to about 100 pounds per square inch of tine cross-sectional area.

8. The device of claim 7 in which the tine pressure is from about 75 to about 85 pounds per square inch of tine cross-sectional area.

* * * * *